United States Patent Office 3,364,254
Patented Jan. 16, 1968

3,364,254
PROCESS FOR PREPARING LOW INORGANIC SALT - CONTAINING ALKALI SULFO-N-ALKYLPROPIONAMIDE
David Randal Sexsmith, Norwalk, Conn., and Edward Helmut Sheers, Flushing, N.Y., assignors to American Cyanamid Company, Stamford, Conn., a corporation of Maine
No Drawing. Filed June 1, 1964, Ser. No. 371,834
5 Claims. (Cl. 260—513)

ABSTRACT OF THE DISCLOSURE

Process for preparation of alkali sulfo-N-alkylpropionamide by sulfonation of the Ritter reaction product of an olefin and an α-unsaturated nitrile in the presence of sulfuric acid, in which the amount of byproduct inorganic salt is reduced by aging the Ritter reaction product before neutralization and sulfonation.

This invention relates to an improved process for the preparation of alkali sulfo-N-alkylpropionamides. More particularly this invention relates to an integrated process for the preparation of alkali sulfo-N-alkylpropionamides containing substantially reduced amounts of inorganic salt contaminates. The products prepared by the process of this invention exhibit surface active properties and are therefore eminently useful in detergent compositions.

Alkali sulfo-N-alkylpropionamides, also described as the sulfonated derivatives of N-alkylacrylamides or alkali N-alkyl-3-sulfopropionamides, may be prepared by sulfonating so-called Ritter reaction products. The latter reaction is disclosed in U.S. Patent 2,573,673 and as herein employed involves the reaction of a suitable olefin or mixtures of suitable olefins and a suitable ethylenically unsaturated nitrile in the presence of a cationoid material such as strong (96–100%) sulfuric acid. The product of the Ritter reaction, the N-alkylacrylamide, is conventionally first separated from impurities and side products to the extent that this is possible. Such impurities are, for example, the organic sulfates resulting from the interaction between the olefin and sulfuric acid and polymeric materials. The purified product is then conventionally sulfonated with an alkali sulfite to obtain the alkali sulfo-N-alkylpropionamide. A preferred process avoids the difficulties inherent in attempting to isolate the N-alkylacrylamide from organic sulfate side products and polymeric impurities by immediately sulfonating the reaction mixture of the Ritter reaction while maintaining a pH of at least 7.5. This latter method has the advantage not only of increasing the yield of alkali sulfo-N-alkylpropionamide but also is an "integrated process," i.e., it is a process which is accomplished without the isolation or separation of intermediate products or by-products from the beginning of the process to the formation of the final useful product.

Although the foregoing method provides a product which has many beneficial applications, there still persist in the final sulfonated reaction product a substantial amount of inorganic salt impurity which renders the product incompatible in many liquid detergent compositions particularly those compositions containing inorganic materials such as trisodium phosphate, tetrapotassium pyrophosphate and the like.

Accordingly, it is an object of the present invention to provide a process in which a Ritter reaction product is sulfonated under conditions which substantially reduce the amount of inorganic salt in the final product.

It is a further object of the present invention to provide an integrated process for the preparation of alkali sulfo-N-alkylpropionamides wherein the amounts of undesirable side products including polymeric materials and inorganic salts are reduced to a maximum of, for example, 15% or less by weight of the final product.

These and other objects of the present invention will become more apparent from the detailed description and examples set forth below.

In accordance with this invention, a process for preparing low inorganic salt-containing alkali sulfo-N-alkylpropionamide is provided which comprises (1) reacting an olefin having at least 10 carbon atoms and an ethylenically unsaturated nitrile in the presence of strong sulfuric acid to form an intermediate reaction mixture which yields as the principal product on hydrolysis an N-alkylacrylamide, (2) aging said intermediate reaction mixture for a time and at a temperature sufficient to reduce the level of inorganic salt content in the final alkali sulfo-N-alkylpropionamide product equivalent to that which can be achieved by aging said intermediate reaction mixture for at least about one hour at from about 70° C. to 90° C., (3) dissolving and neutralizing, (4) sulfonating, and (5) separating inorganic salt from the reaction mixture.

Step 1 above is a conventional Ritter-type reaction and is carried out in accordance with the Ritter patent noted above. The initial reaction product is a reaction mixture of intermediate complex materials which on hydrolysis will yield as the principal product an N-alkylacrylamide. Preferably the intermediate complex is a reaction product resulting from the reaction of an olefin or mixtures of olefins having at least 10 carbon atoms and an ethylenically unsaturated nitrile in the presence of a cationoid material such as concentrated sulfuric acid.

The olefins employed are olefins characterized by having at least 10 carbons and up to 40 carbon atoms, and preferably from between about 10 and 20 carbon atoms, preferably they are predominantly straight chain. When the sulfonated N-alkylacrylamide end product is to be employed as a detergent, it is preferred that the olefin be a long chain material having at least 10 carbon atoms. Such olefins and mixtures thereof are available from the petroleum industry. As examples of suitable olefins, the following are illustrative: decene-1, decene-2, decene-3, decene-4, decene-5; undecene-1, undecene-2, undecene-3, undecene-4, undecene-5; dodecene-1, dodecene-2, dodecene-3, dodecene-4, dodecene-5, dodecene-6; tridecene-1, tridecene-2, tridecene-3, tridecene-4, tridecene-5, tridecene-6; tetradecene-1, tetradecene-2, tetradecene-3, tetradecene-4, tetradecene-5, tetradecene-6, tetradecene-7; pentadecene-1, pentadecene-2, pentadecene-3, pentadecene-4, pentadecene-5, pentadecene-6, pentadecene-7; hexadecene-1, hexadecene-2, hexadecene-3, hexadecene-4, hexadecene-5, hexadecene-6, hexadecene-7, hexadecene-8; octadecene-1, octadecene-2, octadecene-3, octadecene-4, octadecene-5, octadecene-6, octadecene-7, octadecene-8, octadecene-9; telomers of isopropylene and isobutylene such as propylene tetramer, propylene hexamer, triisobutylene, tetraisobutylene, and mixtures of two or more of such olefins or their equivalents.

The ethylenically unsaturated nitrile should be a material which when condensed with the olefin is capable of bisulfite addition at its unsaturated double bond. Principally such nitriles include acrylonitrile, α-substituted acrylonitrile, such as methacrylonitrile, α-chloroacrylonitrile and β-substituted acrylonitriles such as crotononitrile, β-chloroacrylonitrile and other equivalent materials. Obviously, when the terms "N-alkylacrylamide" or "sulfo-N-alkylpropionamide" are used throughout this description, these terms will include the equivalent products prepared from the foregoing equivalent ethylenically unsaturated nitriles.

The reaction between the long chain olefin and the nitrile is carried out in the presence of a cationoid substance capable of fully protonizing the double bond of the olefin. Thus, any material capable of this function in the reaction whereby the intermediate secondary or tertiary N-alkylacrylamides on hydrolysis of the intermediate reaction mixture are prepared is contemplated. However, as a practical matter, such a cationoid substance is limited to strong sulfuric acid. By "strong" is meant sulfuric acid having a concentration of 90% and greater and usually a concentration of from between about 95 and 100% by weight.

In the above procedure the olefin, nitrile and acid are typically reacted in a mol ratio of from about 1:1:1 to 1:1:2, respectively, at suitable temperatures to form the intermediate reaction mixture. If desired, excess nitrile may be employed, though in general no particular advantage is obtained thereby. Preferably, the strong sulfuric acid is added to a mixture of the nitrile and the olefin while said mixture is being maintained at a temperature of less than 90° C. and preferably from between about 20° C. and 80° C. After the addition of the acid, the reaction mixture in the conventional Ritter reaction is maintained at a temperature of 40° C. to less than 90° C. whereby the intermediate reaction mixture containing N-alkylacrylamide as the principal reaction product is prepared.

The aging step, which is critical for increasing the yield of alkali sulfo-N-alkylpropionamide and thereby reducing the level of inorganic salt in the final sulfonated product, may be accomplished in several ways. In each method the objective is to achieve a yield of sulfonated product and an anionic surfactant content (dry basis) above the yield and anionic content (and, correspondingly, a minimum amount of inorganic salt) obtained by conventional preparations. In the conventional process the maximum yield and anionic surfactant content are generally about 60% and 75%, respectively. The standard for the aging step will be that reaction time and temperature which will reduce the level of inorganic salt content in the final alkali sulfo-N-alkylpropionamide equivalent to that which can be obtained by aging the Ritter reaction product of Step 1 for at least about one hour at from about 70° C. to 90° C.

Three methods are available and preferred for attaining the objective of low inorganic salt content in accordance with the foregoing standard. These methods are merely illustrative of the ways in which the critical aging step is performed. Given the present disclosure, other means of achieving aging will be apparent to the routineer in the art. In a first method the aging step may be integral with the Ritter reaction of step 1. By this is meant that if the step 1 Ritter reaction is carried out at a higher temperature and for a time which are coincidental with that of the critical aging temperature range and time, the aging process may then be described as a critically refined Ritter reaction process, i.e., the step 1 Ritter reaction is carried out for at least about one hour, preferably 1 to 3 hours, at from about 70° C. to 90° C.

In a second method for effecting critical aging, the Ritter reaction of step 1 is carried out at temperatures lower than 70° C., for example, 0° to 60° C., and preferably 40° C. to 50° C. When the formation of an intermediate chemical product is evident as determined by conventional means, the reaction temperature is raised to from 70° C. to 90° C. and reaction is continued for at least about one hour longer, preferably 1 to 3 hours. Longer reaction times may be employed, e.g., 5 to 10 hours, but no advantage is gained thereby and in fact the content of active material will begin to fall off.

The foregoing methods for critically aging the intermediate reaction mixture are accelerated procedures. The same result may be obtained in a third method by allowing the intermediate Ritter reaction mixture to stand for extended periods of time, e.g., 2 to 6 months. However, since this long duration is generally not economically feasible, the accelerated procedures are preferred.

Under the foregoing aging conditions, it has been determined that the yield of final sulfonated product based on the weight of starting materials is at least about 65% by weight and that the product after separation of inorganic salt precipitate contains 85% by weight or more of active ingredient, i.e., alkali sulfo-N-alkylpropionamide.

After aging, the reaction mixture is dissolved in water and neutralized by the addition of lime. This dissolution and neutralization may be accomplished in separate steps or preferably in a single step by adding the aged Ritter reaction product to an aqueous slurry of calcium oxide. The amount and concentration of calcium oxide dispersion is not critical. The important result is that the reaction mixture which is generally very viscous be rendered fluid and neutral or alkaline. However, since the reaction mixture must be maintained at a pH of at least 7.5 during the subsequent sulfonation, sufficient lime may be employed to maintain this level of alkalinity throughout the sulfonation step. Alternatively, the pH may again be adjusted to the alkaline side prior to sulfonation by the addition of other alkaline materials. It is important that lime be used as the source of alkalinity in the neutralization step since sufficient calcium ion must be present to precipitate the sulfate ion which is then easily separated from the reaction mixture. Other alkaline materials, e.g., sodium hydroxide or ammonium hydroxide, will form soluble salts which cannot be readily separated and will cause incompatibility of the product with other ingredients of detergent or emulsifier compositions.

Sulfonation is accomplished by the addition of an excess of an alkali bisulfite. The term "alkali bisulfite" is intended to include alkali metal bisulfites and metabisulfites, e.g., sodium, potassium and lithium bisulfite and metabisulfite, as well as ammonium bisulfite and metabisulfite. With the exception of materials added to maintain the pH at 7.5 or higher, no other reagent is required during sulfonation. Thus the conventional need in this step for solvents, such as isopropyl alcohol or hydrocarbon solvents, is eliminated. The reaction mixture during sulfonation is generally heated at a temperature of from about 50° C. to 150° C., preferably at a temperature of from about 60° C. to 90° C. and preferably but not necessarily under reflux conditions. The time of reaction in general varies inversely with the temperature and the time required at a specific temperature may within broad limits be readily determined. Illustratively, sulfonation under reflux may be carried out over periods of from 1 to 5 hours. The bisulfite is normally added in an amount to insure complete sulfonation. Usually a molar equivalent of the bisulfite is sufficient and this amount will provide yields of about 70–75% by weight. However, the yield of sulfonated product is increased to about 85–90% by weight by employing at least about 70% excess of sulfonating agent and preferably 80–100% by weight excess.

A pH of at least 7.5 during sulfonation is essential if the sulfonation reaction is to be completed within a reasonable time, for example, in the order of from about 1 to 5 hours and if the sulfonated N-alkyl propionamide is to be comparatively free of polymer material. Preferably the pH will range from about 8 to 10. The pH may be increased to a higher level, e.g., 12 or higher, but no particular advantage in exceeding 10 is obtained and in fact a pH range of 8 to 10 will favor minimum formation of polymeric side products. Conventional alkaline materials may be employed for pH control, e.g., sodium and ammonium hydroxide.

Following sulfonation the inorganic salt is separated from the reaction mixture by conventional means such as filtration, extraction and the like. The resultant clear solution of alkali sulfo-N-alkylpropionamide containing 15% or less by weight (dry basis) of inorganic salt is useful in liquid detergent formulations and for emulsion polymerization applications.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLE 1

*Conventional preparation of sulfonated Ritter reaction product*

A $C_{11}$–$C_{20}$ cut of α-olefin (1.0 mol) and acrylonitrile (1.0 mol) were mixed at room temperature. To the stirred mixture there was added slowly 1.0 mol of 96% sulfuric acid, holding the temperature between 40° C. and 60° C. by means of a cooling bath. After the acid addition, stirring was continued for 90 minutes.

This intermediate reaction product mixture was added, with stirring, to 800 parts water. Calcium oxide (64 parts) was then added to bring the pH to 9–10. To the resulting slurry 90 parts sodium metabisulfite was added and the pH was again adjusted to 9 using 50% aqueous sodium hydroxide. The reaction mixture was heated at reflux for 2.5 to 3 hours, cooled to about 75° C., and filtered by pressure to eliminate insolubles. The resulting clear amber solution contained 72% active anionic surfactant (on a dry basis). This represented a yield of 54% based on the weight of starting materials.

EXAMPLE 2

The sulfonated Ritter reaction product of Example 1 was prepared in substantially the same manner. However, before water and calcium oxide were added to the reaction product, the intermediate reaction mixture was stored at room temperature for 6 months. Thereafter the water and calcium oxide were added and the remaining steps set forth in Example 1 were followed. The yield of aged product, however, was 70% and the product contained 90% active anionic surfactant (on a dry basis).

EXAMPLE 3

The procedure of Example 1 was substantially followed except that before addition to water followed by the calcium oxide neutralization, the intermediate reaction mixture was heated at 80° C. for three hours. The yield of reaction product was 65% and contained 92% active anionic salt.

EXAMPLE 4

The procedure of Example 1 was substantially followed except that prior to the water addition and neutralization, the reaction mixture was heated at 80° C. to 85° C. for seven hours. The yield was 68% and the product contained 85% active anionic on a dry basis.

EXAMPLE 5

To a solution of 1 mole of acrylonitrile and 1 mole of $C_{11}$–$C_{15}$ olefin, 1.4 moles of 98% $H_2SO_4$ is added over a one hour period, maintaining the temperature at 70° C. On completion of addition the resulting solution is digested at 80° C. for one hour. The resulting brown viscous mass is added to a suspension of 1.4 moles of CaO and 1.0 moles of $Na_2SO_3$ in water and refluxed for 4 hours. The hot solution is filtered from the suspended $CaSO_4$ to obtain a 70% yield of anionic surfactant. On a dry basis the active anionic content is 91%.

The following table is presented for comparison of the yields and active anionic content (dry basis) of a conventional preparation of sulfonated Ritter reaction product and the process of this invention. It will be noted that yields and active anionic percentages were substantially improved by aging and lime neutralization. The amount of inorganic salt remaining in the sulfonated product is approximately the difference over the percentage of active anionic product (dry basis). In the products prepared by the process of this invention, less than 15% inorganic salt remained in the product whereas the conventional procedure gave 28%.

TABLE I

| Example | Reaction Conditions Prior to Neutralization and Sulfonation | Percent Yield | Percent Anionic on a Dry Basis |
|---|---|---|---|
| 1 | Heated at 40–60° C. for 1½ hours (Conventional Procedure). | 54 | 72 |
| 2 | Aged 6 months at room temperature (This Invention). | 70 | 90 |
| 3 | Heated at 80° C. for 3 hours (This Invention). | 65 | 92 |
| 4 | Heated at 80–85° C. for 7 hours (This Invention). | 68 | 85 |
| 5 | Ritter reaction (step 1) run at 80° C. for 1 hour (This Invention). | 70 | 91 |

We claim:

1. A process for preparing a low inorganic salt-containing alkali sulfo-N-alkylpropionamide which comprises (1) reacting an olefin having at least 10 carbon atoms and an α-ethylenically unsaturated nitrile in the presence of strong sulfuric acid to form an intermediate reaction mixture, (2) aging said intermediate reaction mixture after completion of said olefin-nitrile reaction for a time and at a temperature sufficient to reduce the level of inorganic salt content in the final alkali sulfo-N-alkylpropionamide product equivalent to that which can be achieved by aging said intermediate reaction mixture for at least about one hour at from about 70° C. to 90° C., (3) dissolving and neutralizing, (4) sulfonating with an alkali bisulfite while maintaining a pH of at least 7.5, and (5) separating inorganic salt from the reaction mixture.

2. A process for preparing a low inorganic salt-containing alkali sulfo-N-alkylpropionamide which comprises (1) reacting an olefin having at least 10 carbon atoms and an α-ethylenically unsaturated nitrile in the presence of strong sulfuric acid to form an intermediate reaction mixture, (2) aging said intermediate reaction mixture after completion of said olefin-nitrile reaction for at least about one hour at from about 70° C. to 90° C., (3) dissolving and lime-neutralizing, (4) sulfonating with an alkali bisulfite while maintaining a pH of at least 7.5, and (5) separating inorganic salt from the reaction mixture.

3. The process of claim 2 wherein said olefin has from 10 to 20 carbon atoms and the ethylenically unsaturated nitrile is acrylonitrile.

4. The process of claim 2 wherein the intermediate reaction mixture of step 1 is aged at least about one hour at from about 80° C. to 85° C. and the pH during sulfonation is maintained at from about 8 to 12.

5. A process for preparing a low inorganic salt-containing alkali sulfo-N-alkylpropionamide which comprises (1) reacting an olefin having 10 to 20 carbon atoms and acrylonitrile in the presence of strong sulfuric acid to form an intermediate reaction mixture, (2) aging said intermediate reaction mixture after completion of said olefin-acrylonitrile reaction for at least about one hour at from about 80° C. to 85° C. (3) dissolving and neutralizing said reaction mixture with an aqueous slurry of calcium oxide, (4) sulfonating with an alkali bisulfite while maintaining a pH of from about 8 to 10, and (5) separating inorganic salt from the reaction mixture.

References Cited

UNITED STATES PATENTS 3,170,951    2/1965    Sheers et al. _____ 260—513

LORRAINE A. WEINBERGER, *Primary Examiner.*

M. WEBSTER, *Assistant Examiner.*